(12) United States Patent
Cocchi et al.

(10) Patent No.: US 10,206,414 B2
(45) Date of Patent: Feb. 19, 2019

(54) METHOD FOR MAKING ICE CREAM

(71) Applicant: ALI S.p.A.-CARPIGIANI GROUP, Milan (IT)

(72) Inventors: Andrea Cocchi, Calderara di Reno (IT); Roberto Lazzarini, Reggio Emilia (IT)

(73) Assignee: ALI S.P.A.-CARPIGIANI GROUP, Milan (IT)

( * ) Notice: Subject to any disclaimer, the term of this patent is extended or adjusted under 35 U.S.C. 154(b) by 0 days.

(21) Appl. No.: 15/591,739

(22) Filed: May 10, 2017

(65) Prior Publication Data

US 2017/0332659 A1 Nov. 23, 2017

(30) Foreign Application Priority Data

May 23, 2016 (IT) .......................... 102016000052860

(51) Int. Cl.
| | | |
|---|---|---|
| F25B 13/00 | (2006.01) |
| A23G 9/22 | (2006.01) |
| A23G 9/12 | (2006.01) |
| A23G 9/28 | (2006.01) |
| A23G 9/08 | (2006.01) |
| A23G 9/30 | (2006.01) |

(52) U.S. Cl.
CPC ................ *A23G 9/22* (2013.01); *A23G 9/08* (2013.01); *A23G 9/12* (2013.01); *A23G 9/28* (2013.01); *A23G 9/30* (2013.01); *F25B 13/00* (2013.01)

(58) Field of Classification Search
CPC .. F25B 13/00; A23G 9/22; A23G 9/12; A23G 9/28; A23G 9/30; A23G 9/08
See application file for complete search history.

(56) References Cited

U.S. PATENT DOCUMENTS 3,369,596 A 2/1968 Macland
6,041,614 A * 3/2000 Yamaya ................... A23G 9/12
165/61

FOREIGN PATENT DOCUMENTS

| EP | 0059330 A2 | 9/1982 |
| EP | 2082649 A2 | 7/2009 |
| EP | 2578086 A1 | 4/2013 |

(Continued)

OTHER PUBLICATIONS

Arbuckle, W.S.; "Mix Processing; Aging the Mix"; Ice Cream Fourth Edition; Jan. 1, 1986; pp. 213-214; AVI Publishing Company, Inc.; Westport, Connecticut.

(Continued)

*Primary Examiner* — Melvin Jones
(74) *Attorney, Agent, or Firm* — Shuttleworth & Ingersoll, PLC; Timothy J. Klima

(57) ABSTRACT

A method for making ice cream including the following steps, performed in the following order: heating the side walls of the processing container to a preset preheating temperature; placing a basic ice cream mixture in the processing chamber after the step of heating the side walls of the processing container to a preset preheating temperature; deactivating any infectious agents which may be present in the basic mixture by activating the thermal treatment system in heating mode for a predetermined time in order to pasteurize the basic mixture inside the processing chamber; keeping the basic mixture, previously subjected to the thermal treatment inside the processing chamber, for a predetermined hold time.

18 Claims, 3 Drawing Sheets

(56) References Cited

FOREIGN PATENT DOCUMENTS

| EP | 2856888 A1 | 4/2015 |
|----|------------|--------|
| EP | 2932855 A1 | 10/2015 |
| EP | 2936992 A1 | 10/2015 |
| GB | 623699 A | 5/1949 |
| JP | 2000093090 A | 4/2000 |
| WO | WO2013037882 A1 | 3/2013 |
| WO | WO2014188351 A1 | 11/2014 |

OTHER PUBLICATIONS

Italian Search Report dated Jan. 26, 2017 for counterpart Italian Application No. IT UA20163699.

\* cited by examiner

METHOD FOR MAKING ICE CREAM

This application claims priority to Italian Patent Application 102016000052860 filed May 23, 2016, the entirety of which is incorporated by reference herein.

BACKGROUND OF THE INVENTION

This invention relates to a method for making ice cream.

As is known, food safety and hygiene in the food industry in question are particularly important issues.

More specifically, ubiquitous invasive infectious agents such as Salmonella and Listeria monocytogenes are becoming increasingly common in the industry in question.

The Listeria monocytogenes bacterium, in particular, proliferates even at low temperatures and with limited nutritional levels and spreads rapidly by cross-contamination.

A typical example of this context is the process for producing ice cream and the machines used for processing ice cream.

It has also been found that each time the basic mixture comes into contact with any external item (containers, serving utensils), the risk of product contamination increases, which, in effect, means that the overall food safety of the ice cream making process is reduced.

This has given rise to the need to improve food safety in order to provide ice cream which is particularly safe, and which does not have any residual food risk for consumers.

Elimination of the food risk, or at least its drastic reduction to levels which do not represent a problem for someone who eats the ice cream, is a need felt by everyone involved in the trade: from manufacturers of semi-finished food products and related processing machines down to individual ice-cream vendors.

In this context, it is therefore essential to increase the food safety of the ice cream making process and to provide an operating method which is inherently safe, that is, which allows the potential risks of contamination to be eliminated independently of factors external to the preparation performed on the machine, thus guaranteeing a safe end product.

SUMMARY OF THE INVENTION

The aim of this invention is to provide a method for making ice cream which allows the above mentioned needs to be met.

The aim of this invention is also to provide a method for making ice cream which allows the potential risks of contamination of the product to be reduced without introducing further processing and, therefore, further operations on the food product and without extending the processing times.

Another aim of the invention is to provide a method for making ice cream which simplifies operations, reducing the handling of the ingredients.

A further aim of this invention is to provide a method for making ice cream which can be performed in tight spaces.

According to the invention, this aim is achieved by a method for making ice cream comprising the technical features described in one or more of the appended claims.

BRIEF DESCRIPTION OF THE DRAWINGS

The technical features of the invention, with reference to the above aims, are clearly described in the claims below and its advantages are apparent from the detailed description which follows, with reference to the single accompanying drawing which illustrates a preferred, non-limiting example embodiment of the invention, and in which:

DESCRIPTION OF THE PREFERRED EMBODIMENTS

Figure 1:
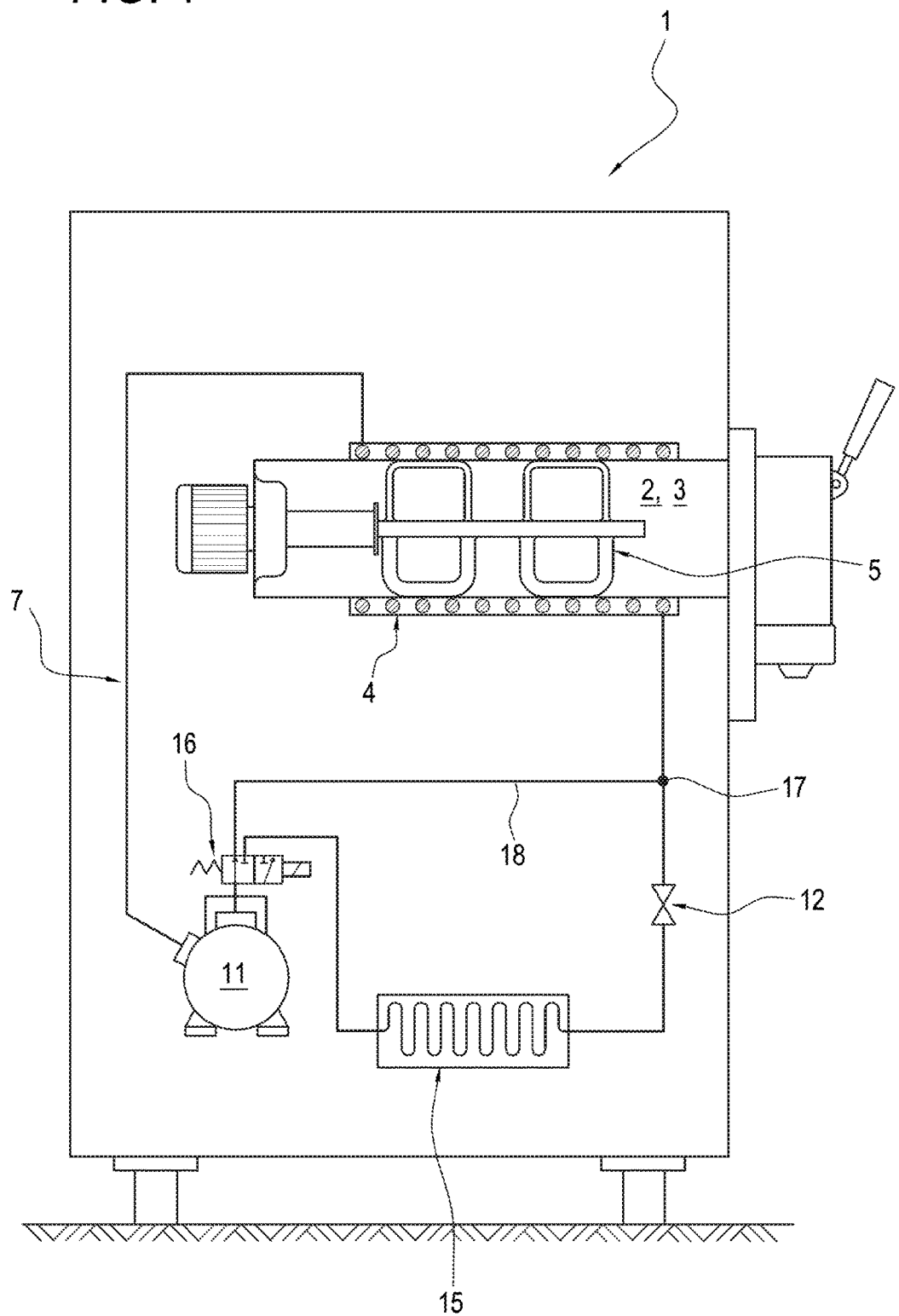
FIG. 1 is a schematic view of a first embodiment of a machine in which the method of this invention is implemented.

With reference to the accompanying drawings, the numeral 1 denotes a machine for making ice cream, designed to make ice cream (preferably artisan gelato) with the method according to this invention.

In the context of the invention, the term "ice cream" is used to mean a food preparation which is based on sugars, milk and milk-derived products and cream and to which fruit, aromatics or other ingredients are added to obtain different flavors (for example, artisan gelato, soft ice cream, sorbets, etc.).

The invention also relates to a method for making ice cream.

It should be noted that the processing method is a batch processing method.

The method comprises a step of preparing a machine 1 for the mixing and cooling of ice cream and equipped with:

a processing container (2) defining a processing chamber (3) and provided with side walls and a stirrer (5) rotating inside the processing chamber (3);

a thermal treatment system, configured to be activated, selectively and alternatively, in heating or cooling mode, for heating and cooling the processing chamber 3, respectively.

Preferably, the thermal treatment system is a thermodynamic system, that is, a system operating according to a thermodynamic cycle.

Again, preferably, the thermal treatment system comprises a compressor.

Further, the thermal treatment system comprises at least one heat exchanger, connected to the processing chamber 3.

Further, according to the invention, the method comprises the following steps:

heating the (side) walls of the processing container 2 to a preset preheating temperature;

placing a basic ice cream mixture in the processing chamber 3 after the step of heating the (side) walls of the processing container 2 to a preset preheating temperature;

deactivating any infectious agents which may be present in the basic mixture by activating the thermal treatment system in heating mode for a predetermined time in order to (simultaneously) pasteurize the basic mixture inside the processing chamber (3);

keeping the basic mixture, previously subjected to the thermal treatment inside the processing chamber 3, for a predetermined hold time;

activating the thermal treatment system in cooling mode to cool the basic mixture and, at the same time, activating the rotary stirrer 5 in rotation, so as to allow incorporating air into the basic mixture to make an ice cream type product in the processing chamber 3;

extracting at least one portion of the ice cream type product from the processing chamber 3.

Preferably, the step of heating the (side) walls of the processing container 2 to a preset preheating temperature comprises a step of heating the (side) walls by activating the thermal treatment system.

It should be noted that the basic mixture is placed in the container 2 when the (side) walls of the container have reached the preheating temperature.

It should be noted that according to the invention, heating the (side) walls of the processing container 2 to a preset preheating temperature before placing the basic mixture inside the processing container 2 advantageously allows reducing the processing time needed to make the finished product and also increases food safety.

In effect, the result is that the basic mixture is thermally treated immediately because the walls of the container are already heated, thereby reducing the risk of bacterial contamination.

Preferably, the preheating temperature (of the side walls of the container 2) is between 55° C. and 85° C.

It should be noted that, according to the invention, the method comprises making ice cream according to a "batch" process, that is, in batches: in effect, a predetermined quantity of basic mixture is loaded and all of it is transformed into ice cream (without, in the meanwhile, adding more basic mixture).

Figure 3:
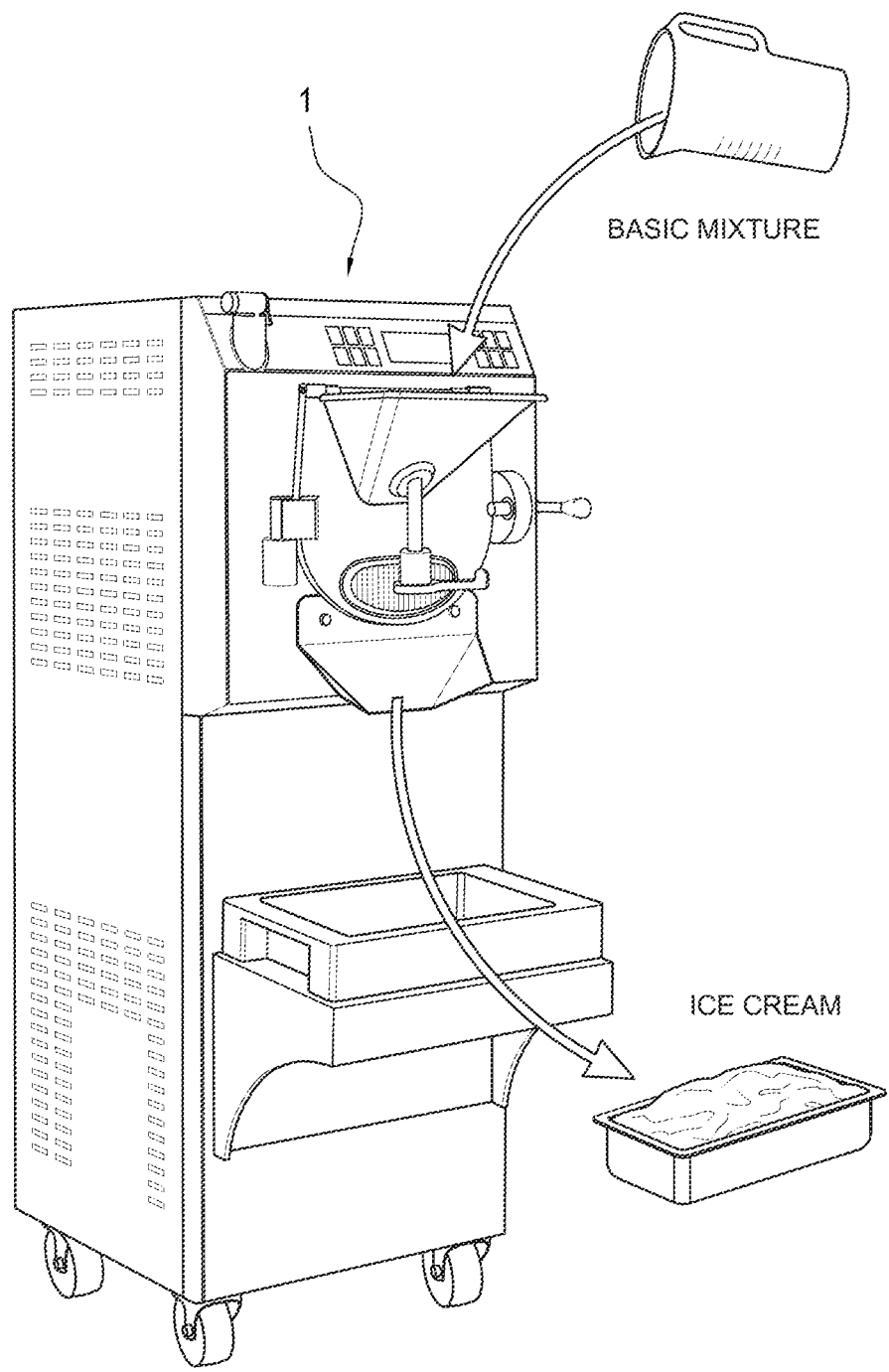
FIG. 3 schematically illustrates the making of ice cream in accordance with the method of the invention.

Preferably, the machine 1 comprises a hopper for feeding the basic mixture (as illustrated in FIG. 3) in the processing chamber 3.

Preferably, the basic mixture comprises milk.

Preferably, the basic mixture also comprises sugar.

It should be noted that the mixing and cooling machine is a batch freezing unit.

According to another aspect, the step of activating the thermal treatment system in cooling mode for cooling the basic mixture inside the processing chamber 3 comprises a step of cooling the mixture to a temperature of between −15° C. and 0° C. (more preferably between −15° C. and 5° C., still more preferably between −12° C. and −7° C.).

It should be noted that in this way, according to the ranges of temperature previously indicated, an ice cream type product of excellent quality is made.

According to yet another aspect, the step of activating the thermal treatment system in heating mode comprises a step of heating the basic mixture to a heating temperature of between 60° C. and 85° C.

Preferably, the heating temperature is between 70° C. and 85° C.

Still more preferably, the heating temperature is between 70° C. and 80° C.

According to another aspect, the heating temperature is preferably greater than 75° C. (and preferably less than 100° C.).

It should be noted, more generally, that the temperature is selected so as to allow the elimination of the Listeria monocytogenes bacteria.

According to a yet further aspect, the method comprises, between the above-mentioned step of activating the thermal treatment system in heating mode and the above-mentioned step of activating the thermal treatment system in cooling mode, a further step of activating the thermal system in cooling mode for a predetermined holding time to keep the basic mixture at a temperature of between 2° C. and 6° C. for the predetermined holding time.

It should be noted that this further step basically has the aim of allowing the pasteurized mixture to be preserved safely before mixing and cooling.

It should be noted that, advantageously, the method according to the invention allows increasing food safety and reducing the potential sources of contact with the product being processed.

In effect, starting from the moment in which the basic mixture is placed in the processing chamber 3, the (semi-finished) product is kept inside the processing chamber 3 until it is extracted; after mixing and cooling the basic mixture, the finished product is extracted directly from the machine.

Thus, during the entire process, the (semi-finished) product does not come into contact with further elements or accessories (nor is it handled by the operator) and remains confined in the processing chamber 3 which constitutes a sealed and safe environment in terms of food safety.

In this way, there is no need to handle the basic mixture, which is kept inside the hygienically safe environment of the processing chamber 3.

Thus, food risks are reduced considerably.

It should also be noted that, according to the method, it is possible to make a product of the ice cream type using a single machine 1: in effect, both pasteurizing and mixing and cooling are performed in the machine 1, inside the same container 3.

It should therefore be noted that the method, according to the invention, increases the food safety of the product, by reducing possible contamination during processing.

In this way, advantageously, the machine 1 may be particularly compact, and the method for making ice cream can be advantageously implemented even in facilities with a small amount of floor space.

According to one aspect, the thermal treatment system is a system operating according to a thermodynamic cycle and comprises a circulation circuit provided with an operating fluid (heat exchanger fluid).

According to another aspect, the thermal treatment system comprises a single compressor.

With reference to the embodiment of FIG. 1, the thermal treatment system is configured to perform, when activated in heating mode, a hot gas thermal cycle.

The thermal treatment system of FIG. 1 is described in more detail below.

The fluid circulation circuit 7 comprises a compressor 11, a first heat exchanger 4, a second heat exchanger 15, and a throttling valve 12, operating according to a thermodynamic cycle. More precisely, the second heat exchanger 15 leads to the delivery terminal of the compressor 11 and is connected to the first heat exchanger 4 through the throttling valve 12.

The first heat exchanger 4 is associated with the processing chamber 3.

More specifically, the first heat exchanger 4 is defined by a coil wound around the walls (preferably the side walls) of the respective processing chamber 3 to exchange heat with the product contained therein.

It should be noted that the term "side walls" in this description is used to mean the side walls of the container 2 (generally cylindrical in shape).

The fluid circulation circuit 7 further comprises a switching valve 16 which is located downstream of the delivery end of the compressor 11 and whose output is connected both to the second heat exchanger 15, at a first switching position of it, and to a node 17 interposed between the throttling valve 12 and the first heat exchanger 4, at a second switching position of it.

The connection between the switching valve 16 and the node 17 is made by a by-pass branch 18.

The switching valve 16 can be controlled by the operator for changing the configuration of the circuit 7.

Operatively, if the switching valve 16 is in its first position, where the by-pass branch 18 is closed and the connection between the compressor 11 and the second heat exchanger 15 is open, the operating mode of the single fluid circulation circuit 7 is the one whereby the first heat exchanger 4 acts as an evaporator and the second heat exchanger 15 acts as a condenser.

Thus, the product in the tank 3 is cooled: the step of activating the thermal treatment system in cooling mode for cooling the basic mixture previously subjected to the thermal treatment (pasteurization) inside the processing chamber 3 is activated and, at the same time, the rotation of the rotary stirrer 5 is activated, so as to allow incorporating air in the basic mixture to make an ice cream type product in the processing chamber 3.

On the other hand, if the switching valve 16 is in its second position, where the by-pass branch 18 is open and the connection between the compressor 11 and the second heat exchanger 15 is closed, the operating mode of the single fluid circulation circuit 7 is the one whereby the throttling valve 12 and the second heat exchanger 15 are cut off from fluid circulation, while the first heat exchanger 4 has fluid flowing through it and transfers heat to the respective tank 3, thereby heating the product contained therein.

In this case, the fluid circulating in the circuit 7 is heated at the compressor 11, where heat is generated by the very effect of its operation (heat generated by friction between the parts of the compressor 11 and by the Joule effect in the electric motor of the compressor 11 itself) and transfers heat to the product in the tank 3 associated with the first heat exchanger 4 which has fluid flowing through it.

The basic mixture in the container 3 is heated: thus, the thermal treatment system is activated in heating mode for a predetermined time for heating the basic mixture inside the processing chamber 3, so as to subject the basic mixture to a thermal treatment (pasteurization) inside the processing chamber 3.

Figure 2:
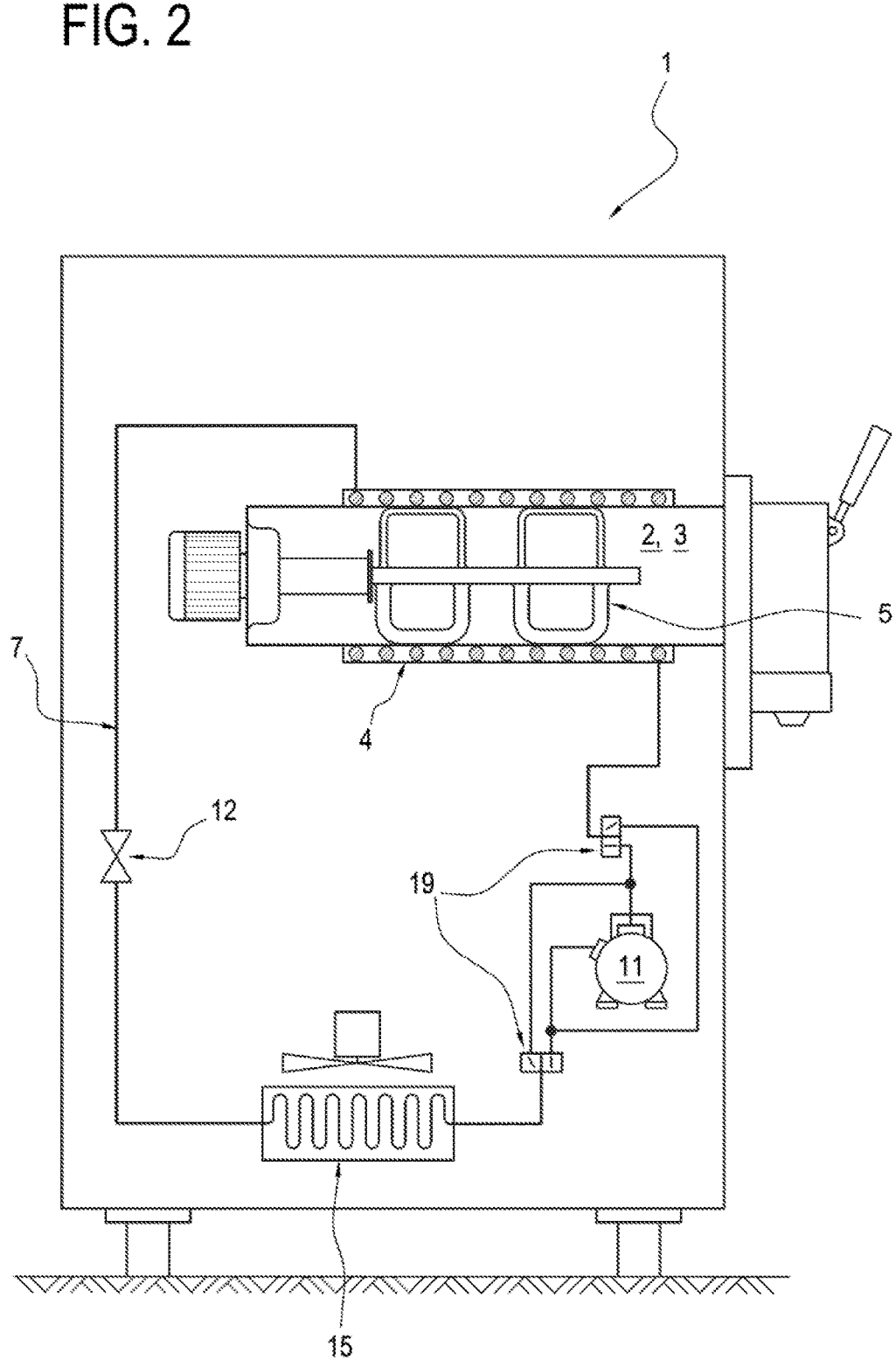
FIG. 2 is a schematic view of a second embodiment of a machine in which the method of the invention is implemented.

With reference to FIG. 2, the circuit 7 for circulation of the operating fluid comprises a compressor 11, a first heat exchanger 4, a second heat exchanger 15, and a throttling valve 12, operating according to a thermodynamic cycle, and the fluid circulation circuit 7 further comprises a valve 19 for inverting the thermodynamic cycle and adjustable between a first configuration, in which the first heat exchanger 4 acts as an evaporator and the second heat exchanger 15 acts as a condenser, and a second configuration, in which the first heat exchanger 4 acts as a condenser and the second heat exchanger 15 acts as an evaporator, and where the step of activating the thermal treatment system in cooling mode comprises a step of setting the valve 19 for inverting the thermodynamic cycle to the first configuration and the step of activating the thermal treatment system in heating mode comprises a step of setting the valve 19 for inverting the thermodynamic cycle to the second configuration.

In other words, the operating fluid circulating circuit 7 can operate, in cooling mode (cooling of the heat exchanger 4) or heat pump mode (heating of the heat exchanger 4) depending on the step to be performed.

It should be noted that—both in the embodiment of FIG. 1 and in the embodiment of FIG. 2—advantageously, there is a single thermal treatment system, which considerably simplifies the machine 1.

Advantageously, according to the invention, when the basic product is loaded into it, the processing container 2 is already preheated: this reduces cycle times and increases food safety.

Preferably, according to the method, the step of heating the walls of the processing container 2 to a preset preheating temperature comprises a step of heating only the side walls of the processing container 2.

What is claimed is:
1. A method for making ice cream, comprising:
  providing a machine for mixing and cooling the ice cream, the machine including:
    a processing container including walls, defining a processing chamber and provided with a rotatable stirrer inside the processing chamber;
    a thermal treatment system, configured to be activated, selectively and alternatively, in a heating mode or a cooling mode, for heating and cooling the processing chamber, respectively;
  wherein the method further comprises the following steps, carried out in the following order:
    heating the walls of the processing container to a preset preheating temperature;
    placing a basic mixture for the ice cream inside the processing chamber;
    deactivating any infectious agents which may be present in the basic mixture by activating the thermal treatment system in the heating mode for a predetermined time to pasteurize the basic mixture inside the processing chamber;
    keeping the basic mixture, previously subjected to the thermal treatment inside the processing chamber, for a predetermined hold time;
    activating the thermal treatment system in the cooling mode to cool the basic mixture and, at the same time, rotating the rotatable stirrer to incorporate air into the basic mixture to make the ice cream in the processing chamber;
    extracting at least one portion of the ice cream from the processing chamber;
  wherein the step of activating the thermal treatment system in the cooling mode comprises a step of cooling the basic mixture to a cooling temperature of between −15° C. and 0° C.

2. The method according to claim 1, wherein the step of heating the walls of the processing container to the preset preheating temperature comprises a step of heating side walls of the processing container.

3. The method according to claim 1, wherein the preset preheating temperature is between 55° C. and 85° C.

4. The method according to claim 1, wherein the step of activating the thermal treatment system in the cooling mode comprises a step of cooling the basic mixture to a cooling temperature of between −15° C. and −5° C.

5. The method according to claim 1, wherein the step of deactivating any infectious agents which may be present in the basic mixture by activating the thermal treatment system in the heating mode comprises a step of heating the basic mixture to a heating temperature of between 55° C. and 85° C.

6. The method according to claim 1, and further comprising, between the step of activating the thermal treatment system in the heating mode and the step of activating the thermal treatment system in the cooling mode, a further step of activating the thermal system in the cooling mode for a predetermined hold time to keep the basic mixture at a temperature of between 2° C. and 6° C. for the predetermined hold time.

7. The method according to claim 1, wherein the predetermined hold time is greater than 2 hours.

8. The method according to claim 1, wherein the thermal treatment system is a system operating according to a thermodynamic cycle and comprises a circulation circuit provided with an operating fluid.

9. The method according to claim 1, wherein the thermal treatment system comprises a single compressor.

10. The method according to claim 8, wherein the thermal treatment system is configured, when activated in the heating mode, to perform a hot gas thermal cycle.

11. The method according to claim 8, wherein the circuit for circulation of the operating fluid comprises a compressor, a first heat exchanger, a second heat exchanger, and a throttling valve, operating according to a thermodynamic cycle, and wherein the fluid circulation circuit further comprises an inverting valve for inverting the thermodynamic cycle, the inverting valve being adjustable between a first configuration, in which the first heat exchanger acts as an evaporator and the second heat exchanger acts as a condenser, and a second configuration, in which the first heat exchanger acts as a condenser and the second heat exchanger acts as an evaporator, and wherein the step of activating the thermal treatment system in the cooling mode comprises a step of setting the inverting valve to the first configuration and the step of activating the thermal treatment system in the heating mode comprises a step of setting the inverting valve to the second configuration.

12. A method for making ice cream, comprising:
providing a machine for mixing and cooling the ice cream, the machine including:
a processing container including walls defining a processing chamber and provided with a rotatable stirrer inside the processing chamber;
a thermal treatment system, configured to be activated, selectively and alternatively, in a heating mode or a cooling mode, for heating and cooling the processing chamber, respectively;
wherein the method further comprises the following steps, carried out in the following order:
heating the walls of the processing container to a preset preheating temperature;
placing a basic mixture for the ice cream inside the processing chamber;
deactivating any infectious agents which may be present in the basic mixture by activating the thermal treatment system in the heating mode for a predetermined time to pasteurized the basic mixture inside the processing chamber;
keeping the basic mixture, previously subjected to the thermal treatment inside the processing chamber, for a predetermined hold time;
activating the thermal treatment system in the cooling mode to cool the basic mixture and, at the same time, rotating the rotatable stirrer to incorporate air into the basic mixture to make the ice cream in the processing chamber;
extracting at least one porting of the ice cream from the processing chamber;
wherein the step of deactivating any infectious agents which may be present in the basic mixture by activating the thermal treatment system in the heating mode comprises a step of heating the basic mixture to a heating temperature of between 55° C. and 85° C.

13. A method for making ice cream, comprising:
providing a machine for mixing and cooling the ice cream, the machine including:
a processing container including walls, defining a processing chamber and provided with a rotatable stirrer inside the processing chamber;
a thermal treatment system, configured to be activated, selectively and alternatively, in a heating mode or a cooling mode, for heating and cooling the processing chamber, respectively;
wherein the method further comprises the following steps, carried out in the following order:
heating the walls of the processing container to a preset preheating temperature;
placing a basic mixture for the ice cream inside the processing chamber;
deactivating any infectious agents which may be present in the basic mixture by activating the thermal treatment system in the heating mode for a predetermined time to pasteurize the basic mixture inside the processing chamber;
keeping the basic mixture, previously subjected to the thermal treatment inside the processing chamber, for a predetermined hold time;
activating the thermal treatment system in the cooling mode to cool the basic mixture and, at the same time, rotating the rotatable stirrer to incorporate air into the basic mixture to make the ice cream in the processing chamber;
extracting at least one portion of the ice cream from the processing chamber;
wherein the thermal treatment system is a system operating according to a thermodynamic cycle and comprises a circulation circuit provided with an operating fluid;
wherein the circuit for circulation of the operating fluid comprises a compressor, a first heat exchanger, a second heat exchanger, and a throttling valve, operating according to a thermodynamic cycle, and wherein the fluid circulation circuit further comprises an inverting valve for inverting the thermodynamic cycle, the inverting valve being adjustable between a first configuration, in which the first heat exchanger acts as an evaporator and the second heat exchanger acts as a condenser, and a second configuration, in which the first heat exchanger acts as a condenser and the second heat exchanger acts as an evaporator, and wherein the step of activating the thermal treatment system in the cooling mode comprises a step of setting the inverting valve to the first configuration and the step of activating the thermal treatment system in the heating mode comprises a step of setting the inverting valve to the second configuration.

14. The method according to claim 13, wherein the thermal treatment system is configured, when activated in the heating mode, to perform a hot gas thermal cycle.

15. The method according to claim 11, wherein the thermal treatment system is configured, when activated in the heating mode, to perform a hot gas thermal cycle.

16. The method according to claim 5, wherein the thermal treatment system is a system operating according to a thermodynamic cycle and comprises a circulation circuit provided with an operating fluid.

17. The method according to claim 16, wherein the circuit for circulation of the operating fluid comprises a compressor, a first heat exchanger, a second heat exchanger, and a throttling valve, operating according to a thermodynamic cycle, and wherein the fluid circulation circuit further comprises an inverting valve for inverting the thermodynamic cycle, the inverting valve being adjustable between a first configuration, in which the first heat exchanger acts as an evaporator and the second heat exchanger acts as a condenser, and a second configuration, in which the first heat exchanger acts as a condenser and the second heat exchanger acts as an evaporator, and wherein the step of activating the thermal treatment system in the cooling mode comprises a step of setting the inverting valve to the first configuration and the step of activating the thermal treatment system in the heating mode comprises a step of setting the inverting valve to the second configuration.

18. The method according to claim 17, wherein the thermal treatment system is configured, when activated in the heating mode, to perform a hot gas thermal cycle.

\* \* \* \* \*